United States Patent [19]
Lee

[11] Patent Number: 5,848,218
[45] Date of Patent: Dec. 8, 1998

[54] ADAPTIVE SYNC PROTECTION METHOD IN DIGITAL REPRODUCTION SYSTEMS AND APPARATUS THEREFOR

[75] Inventor: Sang-rak Lee, Suwon, Rep. of Korea

[73] Assignee: Samsung Electronics Co., Ltd., Kyungki-do, Rep. of Korea

[21] Appl. No.: 624,928

[22] Filed: Mar. 29, 1996

[30] Foreign Application Priority Data

Mar. 31, 1995 [KR] Rep. of Korea .................... 1995-7477

[51] Int. Cl.⁶ ................................................. H04N 5/935
[52] U.S. Cl. .............................................. 386/84; 386/71
[58] Field of Search ................................. 386/46, 71, 84, 386/90, 12, 47; 360/51; 369/48, 49; 348/501; H04N 5/935

[56] References Cited

U.S. PATENT DOCUMENTS

| | | | |
|---|---|---|---|
| 4,275,466 | 6/1981 | Yamamoto | 360/51 |
| 4,791,622 | 12/1988 | Clay et al. | 386/84 |
| 4,843,489 | 6/1989 | Sochor et al. | 360/51 |
| 5,223,991 | 6/1993 | Nagai et al. | 386/68 |
| 5,363,360 | 11/1994 | Fairchild | 369/48 |
| 5,446,715 | 8/1995 | Satomura | 369/49 |
| 5,523,856 | 6/1996 | Kawano et al. | 386/84 |
| 5,604,723 | 2/1997 | Kikata | 369/48 |

FOREIGN PATENT DOCUMENTS

| | | | |
|---|---|---|---|
| 0 096 885 | 12/1983 | European Pat. Off. | G11B 7/00 |
| 0 438 355 | 7/1991 | European Pat. Off. | G11B 7/013 |
| 0 478 014 | 4/1992 | European Pat. Off. | G11B 20/18 |
| 36 42 636 | 6/1988 | Germany | G11B 5/09 |

*Primary Examiner*—Thai Tran
*Assistant Examiner*—Huy Nguyen
*Attorney, Agent, or Firm*—Sughrue, Mion, Zinn, Macpeak & Seas, PLLC

[57] ABSTRACT

An adaptive sync protection apparatus for a digital video cassette recorder (VCR) adaptively protects a sync signal being reference of processing a digital reproduction signal reproduced via a recording medium from the varied reproduction characteristics of a channel. The apparatus comprises a sync detection unit for detecting sync data from the digital reproduction signal and outputting a sync detection signal and a sync signal; a sync prediction/error detection unit for determining sync detection prediction positions for a present track using the sync detection signal and a sync detection reference number, detecting error-sync and sync missing corresponding to the present track based on the sync detection prediction positions and the sync detection signal and outputting an error-sync generation number and an sync missing number; and a reference value generation unit for generating the sync detection reference number with respect to the following track, using the sync missing number and the error-sync generation number of the present track. Accordingly, this apparatus can adapt generation of the sync signal to reproduction characteristics of a channel as the sync detection reference number is adaptively adjusted, even when the reproduction characteristics of a channel provides a relatively good or poor circumstance for sync detection.

19 Claims, 5 Drawing Sheets

FIG. 1

| SYNC AREA | ID CODE | DATA FIELD |

FIG. 2A  SYNC_GET

FIG. 2B  SYNC_IN_REG

ADAPTIVE SYNC PROTECTION METHOD IN DIGITAL REPRODUCTION SYSTEMS AND APPARATUS THEREFOR

BACKGROUND OF THE INVENTION

The present invention relates to an adaptive sync protection method in a digital reproduction system and an apparatus therefor, and more particularly, to an adaptive sync protection method in a digital reproduction system and an apparatus therefor, in which generation of a sync signal for detecting data is adaptively varied according to reproduction characteristics of a channel, to maintain synchronization for data detection although the sync signal is not generated from a digital reproduction signal.

Figure 1:
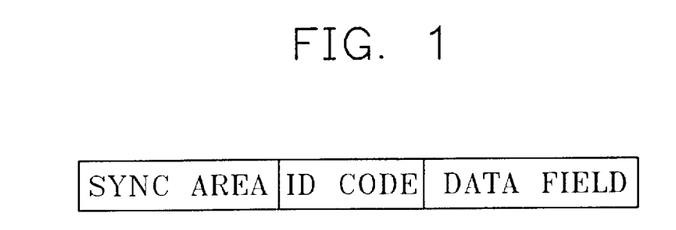
FIG. 1 is a conceptual diagram for explaining a general sync block in a digital VCR.

A digital reproduction apparatus, for example, a digital video cassette recorder (VCR) records and reproduces video or audio data using a magnetic tape. In such a digital VCR, a helical track in the tape is comprised of four sectors including an audio sector and a video sector, and each sector has a plurality of sync blocks. For example, the audio and video sectors have a plurality of data sync blocks each of which is a data processing unit for recording and reproducing the data, respectively. The data sync block has the same structure with respect to the video and audio sectors. As shown in FIG. 1, the data sync block includes a sync area, an identification (ID) code, and a data field. In general, the sync area includes two bytes, the ID code includes three bytes, and the data field includes an M bytes. The audio and video sectors have a preamble, data sync blocks, and a postamble, respectively. The preamble includes two pre-sync blocks in the distal end.

The sync data loaded in a sync area during modulation becomes a reference for detecting a data sync block from a reproduced digital signal. Therefore, if the sync data is not detected well, data following the sync data is not detected well. A conventional system generates a sync signal using the number of bits of a sync block after a constant number of sync data is detected to protect the sync data from an error. In more particular, the sync data contained in the digital reproduction signal is detected by comparing the digital reproduction signal with a predetermined sync pattern. If the detection of the sync data is accomplished by the predetermined number, a sync signal assumes a constant period by a down-counter for counting the number of bits of the data sync block. Accordingly, a detected position of the sync data can be predicted. Thus, use of error sync and occasional miss of the signal sync can be prevented.

However, the detected position of the sync data is fixed by such a conventional method according to the predicted period. Therefore, when the channel reproduction characteristic is varied due to various reasons such as servo, tracking, a thermal noise of a circuit generated during processing of a reproduction signal, and so on, before or after generation of the sync signal, the detection position of the sync data is wrongly predicted.

Also, in the digital VCR, identification data immediately following a sync data as well as the sync data is used for detection of video data and audio data. The identification data has a different value for each sync block. The identification data of the data sync block represents an absolute position on a screen of the data sync block. Therefore, if either the sync data or the identification data is omitted, detection of the following data becomes meaningless. Thus, for the purpose of exactly recording and reproducing a digital signal in the digital VCR, both the sync data and the identification data should be necessarily protected.

SUMMARY OF THE INVENTION

Therefore, it is an object of the present invention to provide a method for adaptively protecting sync signal against the varied reproduction characteristics of a channel.

Another object of the present invention is to provide an apparatus embodying the above method.

To accomplish one object of the present invention, there is provided a sync protection method in a digital reproduction system which adaptively protects a sync signal being reference of processing a digital reproduction signal reproduced via a recording medium from the varied reproduction characteristics of a channel, the method comprising the steps of (a) setting a sync detection reference number;

(b) detecting sync data from the digital reproduction signal in the presently read first data section on a recording medium until the detected number of the sync data is equal to the sync detection reference number, on the basis of comparison of the digital reproduction signal and a predetermined sync pattern;

(c) determining sync detection prediction positions for the presently read first data section, based on the detection of sync data being equal to the sync detection reference number in the step (b), and generating a sync signal according to the determined sync detection prediction positions;

(d) performing detection of sync data from the digital reproduction signal in the presently read data section, using the determined sync detection prediction positions and the predetermined sync pattern, and obtaining a sync missing number and an error-sync generation number, in which the sync missing number of times indicates the number that no sync data is detected from a sync detection prediction position, and the error-sync generation number denotes the number of times that sync data is detected from non-sync detection prediction position; and (e) resetting the sync detection reference number for the following first data section using the sync missing number and the error-sync generation number obtained in the step (d).

Another object of the present invention is accomplished by providing a sync protection apparatus in a digital reproduction system which adaptively protects a sync signal being reference of processing a digital reproduction signal reproduced via a recording medium from the varied reproduction characteristics of a channel, the apparatus comprising:

a sync detection unit for detecting sync data from the digital reproduction signal and outputting a sync detection signal and a sync signal; a reference value generation unit for storing data format information on a recording medium and a sync detection reference number for a present first data section of the recording medium, and generating the sync detection reference number with respect to the following first data section of the recording medium by using the sync missing number and the error-sync generation number obtained in the first data section; a counter unit for counting a predetermined sync block term from a point of time corresponding to a sync detection prediction position, and outputting a counted value; a sync prediction/error detection unit for determining a sync detection prediction position for the present first data section using the sync detection signal applied from the sync detection unit and the sync detection reference number stored in the reference value generation unit, detecting error-sync and sync missing in the present first data section based on the counted value supplied from the counter unit and the sync detection signal, and outputting an error-sync generation number and a sync missing number to the reference value generation unit; and a control unit for controlling the counter unit to execute a counting operation from a point of time corresponding to the sync detection prediction position determined by the sync prediction/error detection unit, and controlling the sync detection unit to generate a sync signal according to the counted value outputted from the counter unit after the sync detection prediction position for the present first data section is determined.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A preferred embodiment of the present invention will be described below in more detail with reference to the accompanying drawings.

Figure 2A:
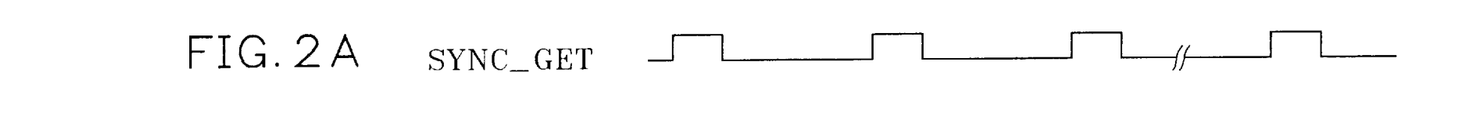
FIGS. 2A and 2B are conceptual diagrams for explaining error-sync and sync missing.
Figure 2B:
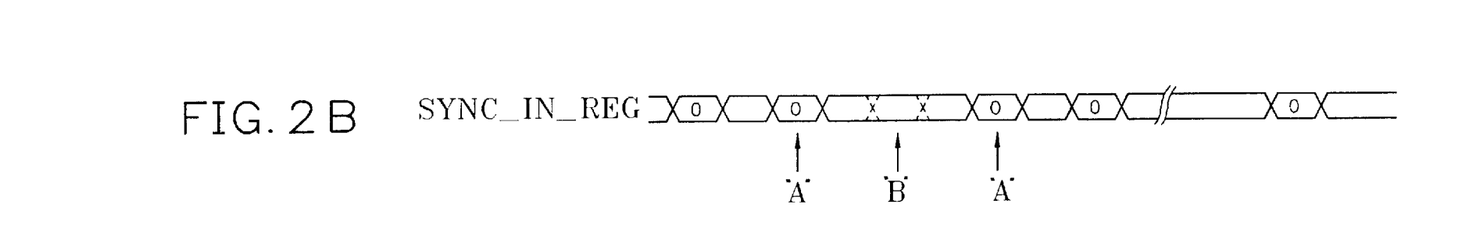

Prior to explanation of the embodiment of the present invention, error-sync and sync missing will be described with reference to FIGS. 2A and 2B. FIG. 2A shows a sync detection signal SYNC_GET representing that sync data has been detected from a digital reproduction signal, and FIG. 2B shows a block term counter value SYNC_IN_REG generated in a down-counter. A position where the counter value SYNC_IN_REG is zero, represents a sync detection predicting position for detecting sync data from the digital reproduction signal. The sync detection signal SYNC_GET of FIG. 2A has a high state when data which is the same as a predetermined sync pattern is found from the digital reproduction signal. Therefore, the positions "A" where the counter value SYNC_IN_REG is zero and the sync detection signals SYNC_GET are low are regarded as timing during which the sync missing error occurs, since the sync data is not detected at those positions. The position "B" where the counter value SYNC_IN_REG is not zero and the sync detection signal SYNC_GET is high is regarded as error-sync occurrence, since the sync data has been detected at that position.

The present invention recognizes the reproduction characteristics of a channel based on the number of generation of the error-sync and sync missing occurrences, and adjusts the number of the sync data to be detected to generate a sync signal. The embodiment of the present invention will be described below referring to FIGS. 3 and 4.

Figure 3:
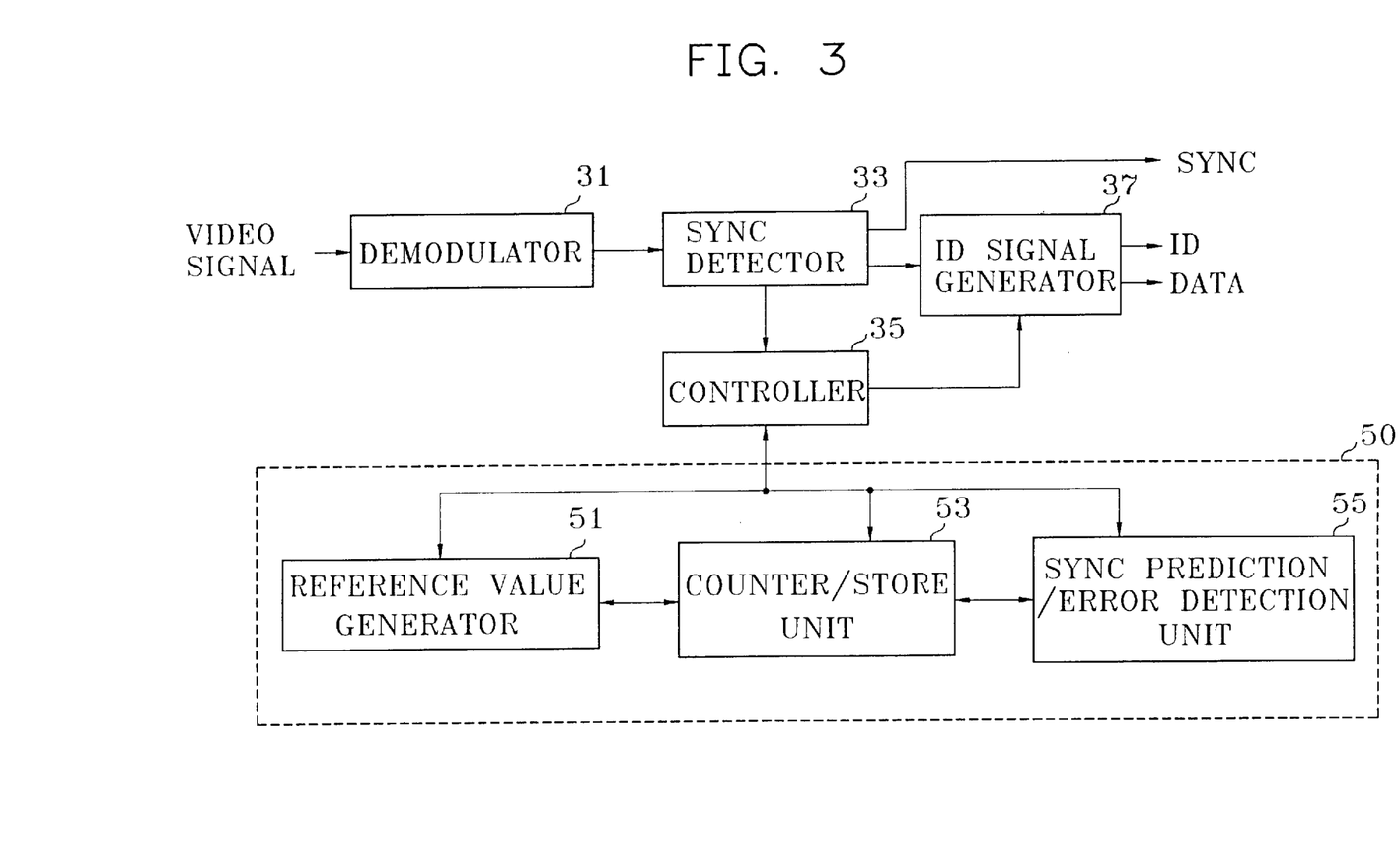
FIG. 3 is a block diagram of an adaptive sync protection apparatus according to a preferred embodiment of the present invention.

FIG. 3 is a block diagram of an adaptive sync protection apparatus according to a preferred embodiment of the present invention. In FIG. 3, a demodulator 31 demodulates a digital reproduction signal received from a head (not shown) and outputs a bitstream of the demodulated signal to a sync detector 33. The sync detector 33 compares the demodulated signal with a predetermined sync pattern, and generates a sync detection signal SYNC_GET which becomes high when ever a congruous portion is detected from the comparison results. The sync detection signal SYNC_GET and the identification data immediately following the detected sync data is supplied to a controller 35. The sync detector 33 also generates a sync signal SYNC under the control of the controller 35. The controller 35 is connected to a reference value generator 51, a counter/store unit 53, and a sync prediction/error detection unit 55 within a channel characteristic detector 50 by using a single common bus BUS. The controller 35 controls the reference value generator 51, the counter/store unit 53 and the sync prediction/error detection unit 55 on a time divisional basis. The reference value generator 51 stores a data record format of magnetic tape, a sync block term value SYNC_TERM, a sync detection reference number N, and an error-sync allowable number M, and generates the sync detection reference number N and the error-sync allowable number M with respect to the following track using the following equations (1) though (3). The counter/store unit 53 stores a sync detection number CNT_N, an identification data prediction value ID_VAL, an error-sync generation number SYNC-ERR and a sync missing number SYNC_MISS, and down-counts the sync block term value. The sync prediction/error detection unit 55 stores a program embodying an algorithm which will be explained with reference to FIG. 4, and executes the algorithm under the control of the controller 35. The controller 35 controls an identification signal generator 37 according to the execution result of the sync prediction/error detection unit 55. The identification signal generator 37 receives a demodulated digital reproduction signal from the sync detector 33, and outputs the identification data ID and the data DATA.

Figure 4A:
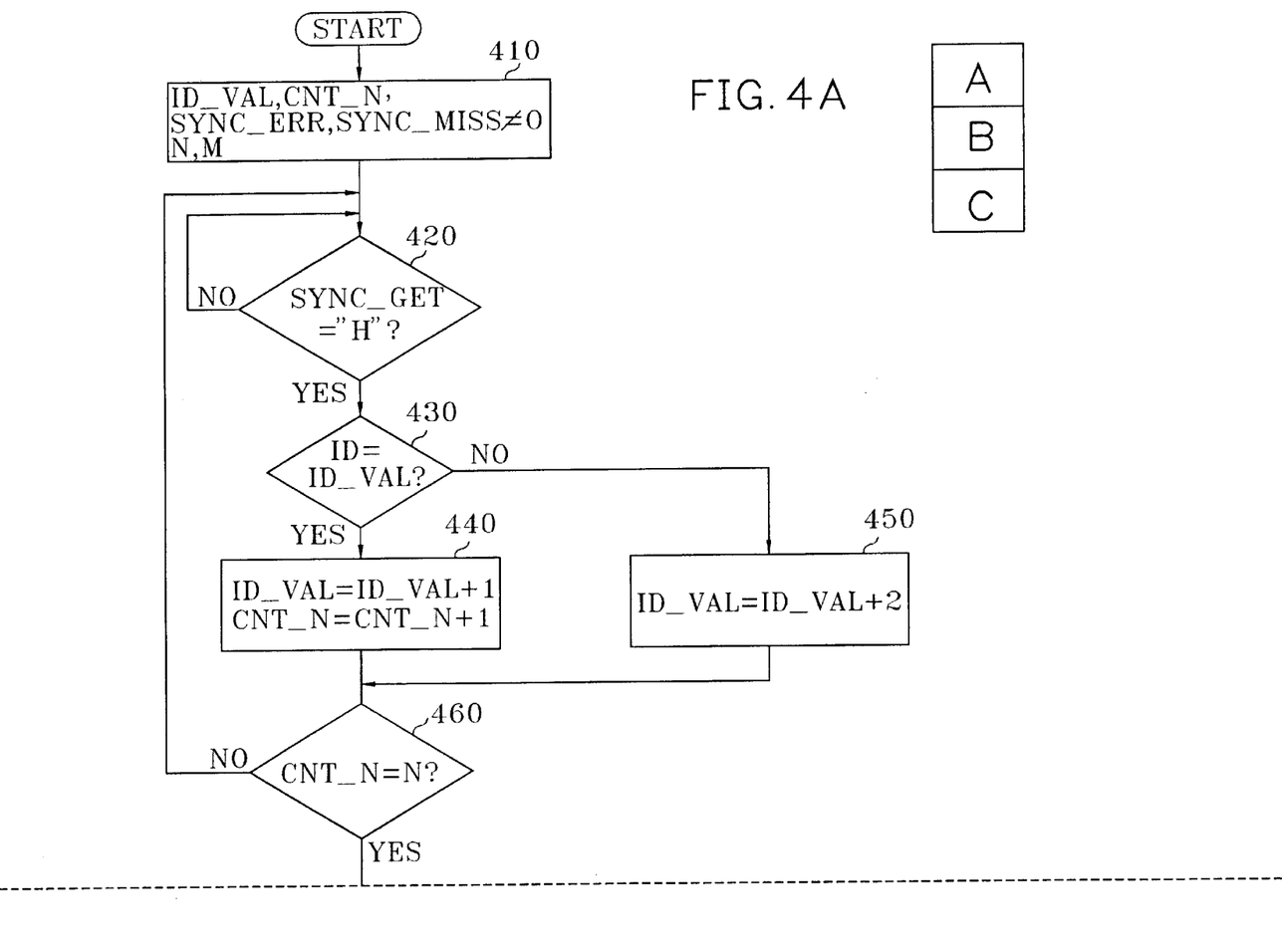
FIGS. 4(A)–4(C) are flow-chart diagrams for explaning an operation of a sync prediction/error detection unit shown in FIG. 3.
Figure 4B:
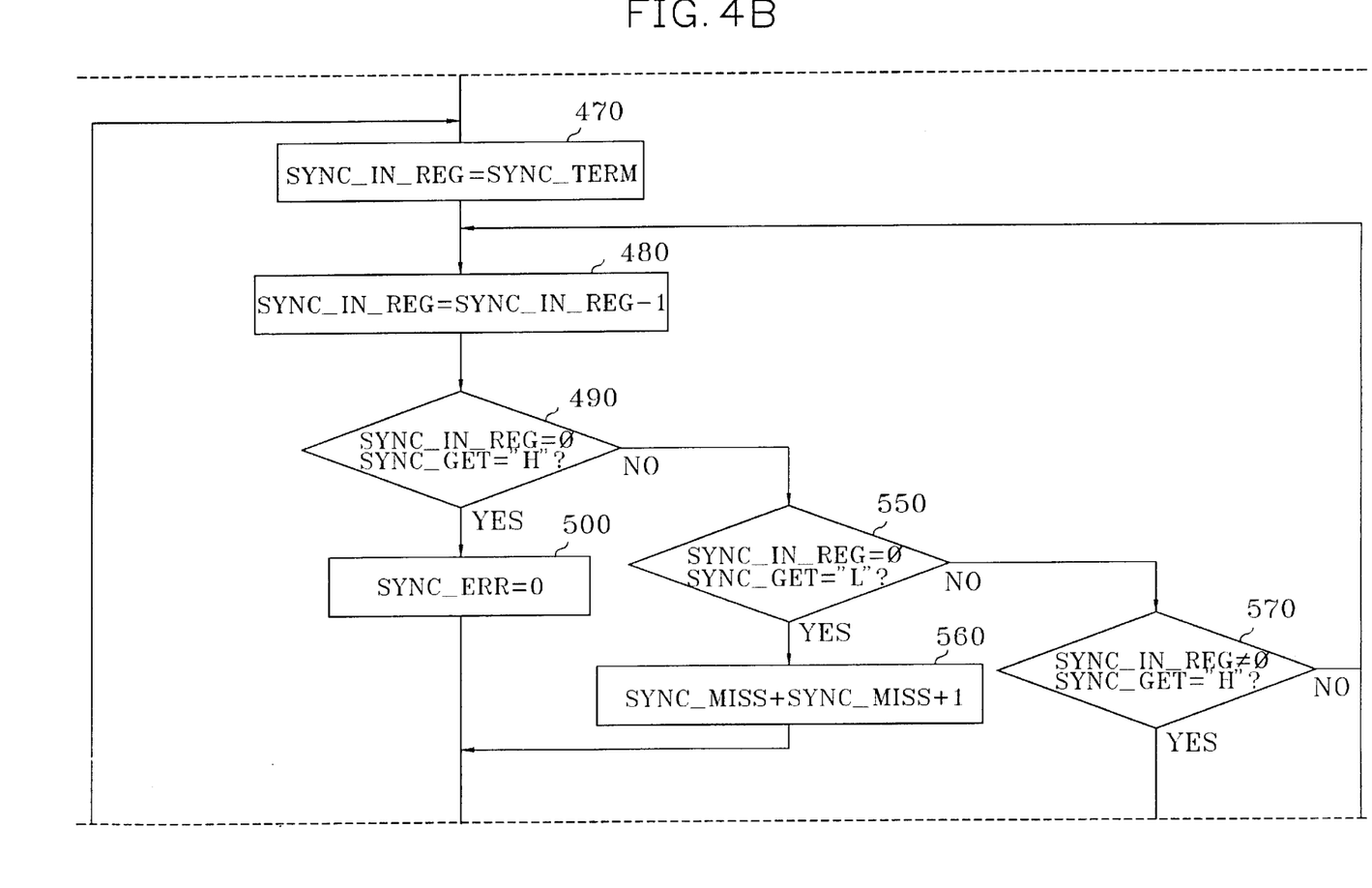
Figure 4C:
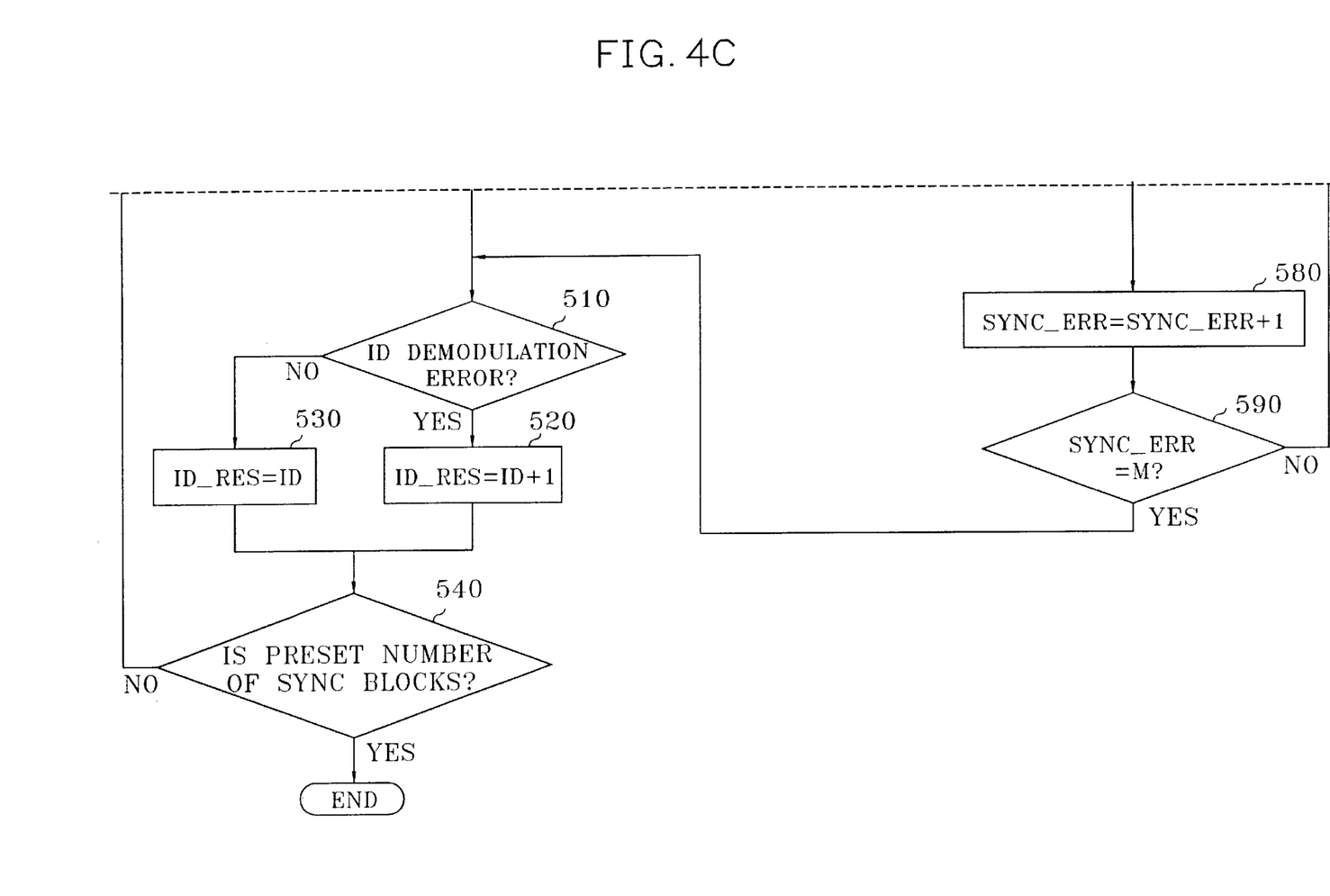

Referring to FIG. 4 showing an operation flow-chart of the channel characteristic detector 50, the operation of apparatus of FIG. 3 will be described below in more detail.

The apparatus of FIG. 3 detects the error-sync and sync missing for each track, and adaptively determines the sync detection reference number N and the error-sync allowable number M which are used as references for sync detection of the following track, particularly, the next following track.

When the apparatus of FIG. 3 starts to operate, in step 410 the controller 35 controls the counter/store unit 53 and initializes registers (not shown) which are contained in the counter/store unit 53 and stores the sync detection number CNT_N, the error-sync generation number SYNC_ERR, the sync missing number SYNC_MISS, and the identification data prediction value ID_VAL. By this initialization, the sync detection number CNT_N, the error-sync generation number SYNC-ERR, the sync missing number SYNC_MISS are initialized into zero, and the identification data prediction value ID_VAL is initialized into an initial value, for example, zero. Here, the identification data prediction value ID_VAL, is used to exactly detect the following identification data even when an error occurs in the identification data immediately following the sync data. The controller 35 initializes also the sync detection reference number N and the error-sync allowable number M stored in the reference value generator 51. The values of the M and N are stored in the reference value generator 51 in advance for the initial operation of the system, and are newly determined for each track according to the error-sync generation number SYNC_ERR and the sync missing number SYNC_MISS.

After the initialization is completed by the execution of step 410, the sync detector 33 performs a detection operation of the sync data from the demodulated digital reproduction signal, and supplies the sync detection signal SYNC_GET representing the detection result to the sync prediction/error detection unit 55 via the controller 35. Here, the controller 35 detects the identification data ID contained in the output signal of the sync detector 33 and supplies the detected identification data ID to the sync prediction/error detection unit 55.

The sync prediction/error detection unit 55 judges whether the sync detection signal SYNC_GET is high in step 420. If the sync detection signal SYNC_GET is high, the sync prediction/error detection unit 55 executes step 430 and judges if the identification data prediction value ID_VAL stored in the counter/store unit 53 is same as that of the identification data ID output from the controller 35. It is checked whether the proper identification data is detected by checking the outcome of the execution of step 430. If both values are same in step 430, the sync prediction/error detection unit 55 executes step 440, increases the identification data prediction value ID_VAL stored in the counter/store unit 53 by one, and also increases the sync detection number CNT_N by one. Meanwhile, if both values are not same, the sync prediction/error detection unit 55 performs step 450 and increases the identification data prediction value ID_VAL stored in the counter/store unit 53 by two. This step 450 enables the detection of the sync data and the identification data even though the sync data is detected but the identification data is not detected due to the error. In step 460, the sync prediction/error detection unit 55 compares the sync detection number CNT_N with the sync detection reference number N. The steps 420 through 460 are repeatedly performed until the number of detection of the sync data from the digital reproduction signal, that is, the sync detection number CNT_N will be same as the sync detection reference number N.

If both values are same in step 460, that is, the sync data is detected by the sync detection reference number N, the sync block term value SYNC_TERM stored in the reference value generator 51 is loaded as the block term counter value SYNC_IN_REG into the counter/store unit 53 in step 470. This step 470 is executed under the control of the controller 35 which controls the reference value generator 51, the counter/store unit 53 and the sync prediction/error detection unit 55. In step 480, the counter/store unit 53 down-counts the block term counter value SYNC_IN_REG on the basis of the system clock. For example, assuming that a data length of one sync block is ninety bytes, the block term counter value SYNC_IN_REG has a time value corresponding to the ninety bytes. After the sync detection position has been predicted, the counter/store unit 53 down-counts the loaded block term counter value SYNC_IN_REG, and supplies the counted value to the sync detector 33 via the controller 35. Thus, the sync detector 33 can generate the sync signal SYNC although the demodulated signal of the demodulator 31 does not contain the sync data.

The sync prediction/error detection unit 55 detects the error-sync number and the sync missing number on the basis of the sync term counter value SYNC_IN_REG whose value is decreased by the down-counting operation and the sync detection signal SYNC_GET of the sync detector 33. In more detail, the sync prediction/error detection unit 55 judges whether the block term counter value SYNC_IN_REG is zero and simultaneously the sync detection signal SYNC_GET is high in step 490. If both conditions are met in step 490, since sync data is exactly detected at the position of the sync detection predicting position of the sync block, the sync prediction/error detection unit 55 performs step 500 to set the error-sync generation number SYNC_ERR to zero, and then performs step 510. Meanwhile, if both conditions are not met in step 490, the sync prediction/error detection unit 55 performs step 550, to judge whether the block term counter value SYNC_IN_REG is zero, and simultaneously the sync-GET is low. Here, a point of time where the block term counter value SYNC_IN_REG is zero means a sync detection prediction position. If both conditions are met in step 550, since sync missing occurs at the sync detection predicting position of the sync block, the sync prediction/error detection unit 55 increases the sync missing number SYNC_MISS by one in step 560. Thereafter, the sync prediction/error detection unit 55 performs step 510. Meanwhile, if both conditions are not met in step 550, the sync prediction/error detection unit 55 performs step 570 to judge whether the block term counter value SYNC_IN_REG is not zero, and simultaneously the sync detection signal SYNC_GET is high. If both conditions are not met in step 570, it means that the error-sync and the sync missing with respect to one sync block period are not completely detected. Therefore, the sync prediction/error detection unit 55 performs again step 480 and the subsequent steps. Meanwhile, if both conditions are met, the sync prediction/error detection unit 55 judges that the error-sync is generated in the sync block and increases the error-sync generation number SYNC-ERR by one. In step 590, the sync prediction/error detection unit 55 judges whether the error-sync generation number SYNC_ERR is consistent with the error-sync allowable number M. If it is not consistent, since the error-sync generation number SYNC_ERR which has been currently generated is smaller than the error-sync number which becomes allowed in one sync block, the sync prediction/error detection unit 55 performs step 480 and the subsequent steps to detect the generation number of the sync missing and error-sync with respect to the sync block. Meanwhile, if the error-sync generation number SYNC_ERR is same as the error-sync allowable number M in step 590, the sync prediction/error detection unit 55 judges that the error-sync of the allowable error-sync number M is detected from the sync block and performs step 510. In step 510, the sync prediction/error detection unit 55 judges whether the identification data ID is detected from the corresponding sync block. If the identification data ID is not detected due to an error, the sync prediction/error detection unit 55 performs step 520 and increases a corresponding register value ID_RES in the counter/store unit 53 by one. Meanwhile, if the identification data ID is detected well, the sync prediction/error detection unit 55 performs step 530, and stores the identification data value ID_RES in the corresponding register value in the counter/store unit 53.

The controller 35 reads a value ID_RES stored in a register by step 520 or 530 and supplies the read value to the identification signal generator 37, for a sync block from which the identification data is not detected due to an error after the sync detection position has been predicted. The identification signal generator 37 separates the identification data and the data DATA from the demodulated signal of the sync detector 33, and outputs the separated data. The identification signal generator 37 outputs the identification data supplied from the controller 35 as the corresponding identification data in case of the sync block from which the identification data is not detected.

If the number of the sync blocks which are used to detect the channel reproduction characteristic is not the same as the number of the sync blocks which have been used to detect the sync missing and the error-sync in step 540, the sync prediction/error detection unit 55 performs step 470 and the subsequent steps with respect to the following sync block. Meanwhile, if both numbers are consistent, the sync prediction/error detection unit 55 stops the detection of the channel reproduction characteristic with respect to the track.

If the above-described processing for detection of the channel reproduction characteristic is completed with respect to one track, the sync prediction/error detection unit 55 transmits the sync missing number SYNC_MISS and the error-sync generation number SYNC_ERR obtained by such a signal processing to the reference value generator 51. The reference value generator 51 uses the following equations (1) through (3), to determine the error-sync allowable number M and the sync detection reference number N for a track following the track T−1 which is used to detect the sync missing number SYNC_MISS and the error-sync generation number SYNC_ERR, that is, the track T.

$$\Delta T = SYNC\_MISS + SYNC\_ERR - Th \quad (1)$$

$$N(T) = N(T-1) + [\Delta T \times W_G], \; N_{MIN} < N(T) < N_{MAX} \quad (2)n$$

$$M(T) = M(T-1) - [\Delta T \times W_G], \; M_{MIN} < M(T) < M_{MAX} \quad (3)$$

Here, [ ] is a function for determining the smallest integer value corresponding to an input. $W_G$ is a weight value for appropriately adjusting a degree of change of values of M and N. Using the above equations (1) through (3), when a sum of the error-sync generation number SYNC_ERR and the sync missing number SYNC_MISS is smaller than a threshold value Th, the value N is decreased and the value M is increased. Reversely, if the sum of the error-sync generation number SYNC_ERR and the sync missing number SYNC_MISS is greater than or equal to the threshold value Th, the value N is increased and the value M is decreased. Therefore, using the above equations (1) through (3), the error-sync allowable number M is further increased and simultaneously the sync detection reference number N is further decreased when the channel reproduction characteristic provides a relatively excellent circumstance for the sync detection. Accordingly, a smaller number of the sync blocks can be used to detect the channel reproduction characteristic. Thus, this brings an additional effect which enables to determine the channel reproduction characteristic more efficiently. Also, when the channel reproduction characteristic provides a relatively poor circumstance for the sync detection, the error-sync allowable number M is further decreased and simultaneously the sync detection reference number N is further increased. Accordingly, the sync detection can be accomplished even under the poor channel reproduction characteristic.

The reference value generator 51 calculates the sync detection reference number N and the error-sync allowable number M for the next track by using the above equations (1) through (3), and stores the calculated values therein. The sync detection reference number N and the error-sync allowable number M stored in the reference value generator 51 are used to recognize the sync detection and the channel reproduction characteristic with respect to the next track.

Although it is not particularly referred to in the above-described embodiment, it is apparent to one skilled in the art that all blocks including a sync block as well as an audio sector and a video sector can be used as the sync block used to see the channel reproduction characteristic.

As described above, the present invention uses the detected sync missing number and the error-sync generation number to identify the channel reproduction characteristic, and adapts the sync detection parameters to the channel reproduction characteristic after the channel reproduction characteristic has been recognized. As a result, the problems due to the variable channel reproduction characteristics, that is, one which does not detect accurately the sync position even with a predetermined number of the sync detection and the other which deviates the sync position due to the alteration of the channel reproduction characteristic after the sync position has been accurately detected, can be solved.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A sync protection method in a digital reproduction system which adaptively protect a sync signal being reference of processing a digital reproduction signal reproduced via a recording medium from the varied reproduction characteristics of a channel, the method comprising the steps of:

(a) setting a sync detection reference number;

(b) detecting sync data from the digital reproduction signal in a presently read first data section on a recording medium until the detected sync data in number is equal to said sync detection reference number, on the basis of comparison of the digital reproduction signal and a predetermined sync pattern;

(c) determining sync detection prediction positions for said presently read first data section, based on the detection of sync data accomplished in said step (b), and generating a sync signal according to the determined sync detection prediction positions;

(d) performing detection of sync data from the digital reproduction signal in said presently read first data section, using the determined sync detection prediction positions and said predetermined sync pattern, and obtaining a sync missing number and an error-sync generation number, in which the sync missing number indicates the number that no sync data is detected from a sync detection prediction position, and the error-sync generation number denotes that sync data is detected from non-sync detection prediction position; and (e) resetting said sync detection reference number for the following first data section using the sync missing number and the error-sync generation number obtained in said step (d).

2. The sync protection method in a digital reproduction system according to claim 1, wherein said step (d) is executed for part of said presently read first data section.

3. The sync protection method in a digital reproduction system according to claim 2, wherein said step (d) is executed for a following part after a plurality of sync data used for determining the sync detection prediction position of said presently read first data section are detected.

4. The sync protection method in a digital reproduction system according to claim 1, wherein said step (d) comprises the sub-steps of:

(da1) judging whether sync data is detected from the determined sync detection prediction position;

(da2) setting the error-sync generation number to zero when detection of the sync data is determined in said step (da1);

(da3) increasing by one a sync missing number when no detection of the sync data is determined in said step (da1);

(da4) judging whether the sync data is detected from non-determined sync detection prediction position; and (da5) increasing by one the error-sync generation number when detection of the sync data is determined in said step (da4).

5. The sync protection method in a digital reproduction system according to claim 1, wherein said step (e) decreases said sync detection reference number for the following first data section, when a sum of the error-sync generation number and the sync missing number detected in said presently read first data section is smaller than a predetermined threshold value, and increases said sync detection reference number for the following first data section, when the sum of the error-sync generation number and the sync missing number detected in said presently read first data section is larger than the predetermined threshold value.

6. The sync protection method in a digital reproduction system according to claim 5, wherein said step (e) calculates the sync detection reference number N(T) of the following first data section using the equation;

in case of $N_{MIN} < N(T) < N_{MAX}$, $N(T) = N(T-1) + [\Delta T \times W_G]$ which represents a relationship between the sync detection reference number N(T-1) in said presently read first data section (T-1) and a sync detection reference number N(T) in said following first data section (T), where, $\Delta T$=sync missing number+error-sync generation number −threshold value, [ ] is a function for determining the smallest integer value corresponding to an input, and $W_G$ is a weight value.

7. The sync protection method in a digital reproduction system according to claim 1, wherein said first data section is a track section including sync blocks of a digital video cassette recorder (VCR).

8. The sync protection method in a digital reproduction system according to claim 7, wherein said step (a) further comprises sub-step (aa1) of setting an error-sync allowable number with respect to each of sync blocks within respective track.

9. The sync protection method in a digital reproduction system according to claim 8, wherein said step (d) comprises sub-steps of:

(db1) judging whether sync data is detected from a position within each sync block except the determined sync detection prediction position;

(db2) increasing by one an error-sync generation number when detection of the sync data is determined in said step (db1); and (da3) iterating said step (db1) with respect to said sync block used for a judgement operation in said step (db1) until the error-sync allowable number is same as the error-sync generation number.

10. The sync protection method in a digital reproduction system according to claim 8, wherein said step (e) decreases the sync detection reference number for the following first data section and at the same time increases the error-sync allowable number for said following first data section, when a sum of the error-sync generation number and the sync missing number detected in said presently read first data section is smaller than a predetermined threshold value, and increases the sync detection reference number for the following first data section and at the same time decreases the error-sync allowable number for said following first data section, when the sum of the error-sync generation number and the sync missing number detected in said presently read first data section is larger than a predetermined threshold value.

11. The sync protection method in a digital reproduction system according to claim 10, wherein said step (e) calculates the sync detection reference number N(T) and the error-sync allowable number M(T) of said following first data section using the equations:

in case of $N_{MIN} < N(T) < N_{MAX}$, $N(T) = N(T-1) + [\Delta T \times W_G]$ which represents a relationship between the sync detection reference number N(T-1) in said presently read first data section (T-1) and a sync detection reference number N(T) in said following first data section (T), and in case of $M_{MIN} < M(T) < M_{MAX}$, $M(T) = M(T-1) + [\Delta T \times W_G]$ which represents a relationship between a sync missing allowable number M(T-1) in said presently read first data section (T-1) and an error-sync allowable number M(T) in said following first data section (T), where, $\Delta T$=sync missing number+error-sync generation number −threshold value, [ ] is a function for determining the smallest integer value corresponding to an input, and $W_G$ is a weight value.

12. The sync protection method in a digital reproduction system according to claim 7, wherein said step (b) further comprises the sub-steps of:

(ba1) performing a detection operation of identification data following the sync data whenever the sync data is detected; and (ba2) generating an identification data prediction value and setting the generated identification data prediction value as identification data for a corresponding sync block, when no identification data is detected in said step (ba1).

13. A sync protection apparatus in a digital reproduction system which adaptively protect a sync signal being reference of processing a digital reproduction signal reproduced via a recording medium from the varied reproduction characteristics of a channel, the apparatus comprising:

a sync detection unit for detecting sync data from the digital reproduction signal and outputting a sync detection signal and a sync signal;

a reference value generation unit for storing data format information of the recording medium and a sync detection reference number for a presently read first data section of the recording medium, and generating the sync detection reference number with respect to the following first data section of the recording medium by using a sync missing number and an error-sync generation number obtained in said first data section;

a counter unit for counting a predetermined sync block term from a point of time corresponding to a sync detection prediction position, and outputting a counted value;

a sync prediction/error detection unit for determining a sync detection prediction position for said presently read first data section using the sync detection signal applied from said sync detection unit and the sync detection reference number stored in said reference value generation unit, detecting error-sync and sync missing in said presently read first data section based on the counted value supplied from said counter unit and said sync detection signal, and outputting an error-sync generation number and a sync missing number to said reference value generation unit; and a control unit for controlling said counter unit to execute a counting operation from a point of time corresponding to the sync detection prediction position determined by said sync prediction/error detection unit, and controlling said sync detection unit to generate the sync signal according to the counted value outputted from said counter unit after the sync detection prediction position for said presently read first data section is determined.

14. The sync protection apparatus in a digital reproduction system according to claim 13, wherein said reference value generation unit decreases the sync detection reference number for the following first data section, when a sum of the error-sync generation number and the sync missing number detected in said presently read first data section is smaller than a predetermined threshold value, and increases the sync detection reference number for the following first data section, when the sum of the error-sync generation number and the sync missing number detected in said presently read first data section is larger than a predetermined threshold value.

15. The sync protection apparatus in a digital reproduction system according to claim 14, wherein said reference value generation unit calculates the sync detection reference number N(T) of the following first data section using the equation:

in case of $N_{MIN}<N(T)<N_{MAX}$ $N(T)=N(T-1)+[\Delta T \times W_G]$ which represents relationship between the sync detection reference number N(T-1) in said presently read first data section (T-1) and a sync detection reference number N(T) in said following first data section (T), where, $\Delta T$=sync missing number+error-sync generation number -threshold value, [ ] is a function for determining the smallest integer value corresponding to an input, and $W_G$ is a weight value.

16. The sync protection apparatus in a digital reproduction system according to claim 13, wherein said first data section is a track section including sync blocks of a digital video cassette recorder (VCR).

17. The sync protection apparatus in a digital reproduction system according to claim 16, wherein said reference value generation unit further stores an error-sync allowable number for a sync block, and decreases the sync detection reference number for the following first data section and at the same time increases the error-sync allowable number for said following first data section, when a sum of the error-sync generation number and the sync missing number detected in said presently read first data section is smaller than a predetermined threshold value, and increases the sync detection reference number for the following first data section and at the same time decreases the error-sync generation number for said following first data section, when the sum of the error-sync generation number and the sync missing number detected in said presently read first data section is larger than a predetermined threshold value.

18. The sync protection apparatus in a digital reproduction system according to claim 17, wherein said reference value generation unit calculates the sync detection reference number N(T) and the error-sync allowable number M(T) of said following first data section using the equations:

in case of $N_{MIN}<N(T)<N_{MAX}$, $N(T)=N(T-1)+[\Delta T \times W_G]$ which represents relationship between the sync detection reference number N(T-1) in said presently read first data section (T-1) and a sync detection reference number N(T) in said following first data section (T), and in case of $M_{MIN}<M(T)<M_{MAX}$ $M(T)=M(T-1)+[\Delta T \times W_G]$ which represents relationship between a sync missing allowable number M(T-1) in said presently read first data section (T-1) and an error-sync allowable number M(T) in said following first data section (T), where, $\Delta T$=sync missing number+error-sync generation number-threshold value, [ ] is a function for determining the smallest integer value corresponding to an input, and $W_G$ is a weight value.

19. The sync protection apparatus in a digital reproduction system according to claim 16, further comprising an identification signal generator receiving output data from said sync detection unit and separating the identification data, wherein said sync prediction/error detection unit performs a detection operation of identification data following each sync block, and generates an identification data prediction value when no identification data is detected, and said control unit controls the identification data prediction value generated by said sync prediction/error detection unit to be supplied to a corresponding sync block via said identification signal generator, when no identification data is detected.

* * * * *